(No Model.)

H. THRESHER.
VELOCIPEDE.

No. 366,703. Patented July 19, 1887.

Witnesses
Chas. B. Shumway
Edward H. Rogers

Inventor
Harry Thresher
By George D. Seymour
Atty.

UNITED STATES PATENT OFFICE.

HARRY THRESHER, OF LONDON, COUNTY OF MIDDLESEX, ENGLAND, ASSIGNOR TO ALBERT H. OVERMAN, OF BOSTON, MASSACHUSETTS.

VELOCIPEDE.

SPECIFICATION forming part of Letters Patent No. 366,703, dated July 19, 1887.

Application filed May 17, 1887. Serial No. 238,456. (No model.) Patented in England April 21, 1885, No. 4,906.

*To all whom it may concern:*

Be it known that I, HARRY THRESHER, a subject of the Queen of Great Britain, residing at London, in the county of Middlesex, England, have invented certain new and useful Improvements in Velocipedes, (for which I have received Letters Patent in Great Britain No. 4,906, dated April 21, 1885,) of which the following is a full and complete specification.

My invention relates to the construction of the fork or frame for carrying the steering or trailing wheel of a bicycle, tricycle, or other velocipede; and it has for its object the suppression and isolation of vibration by constructing the fork or frame carrying the wheel in such a manner that the end of it carrying the wheel may vibrate in a vertical plane without affecting the part of the main frame of the machine to which it is attached.

Figure 1:
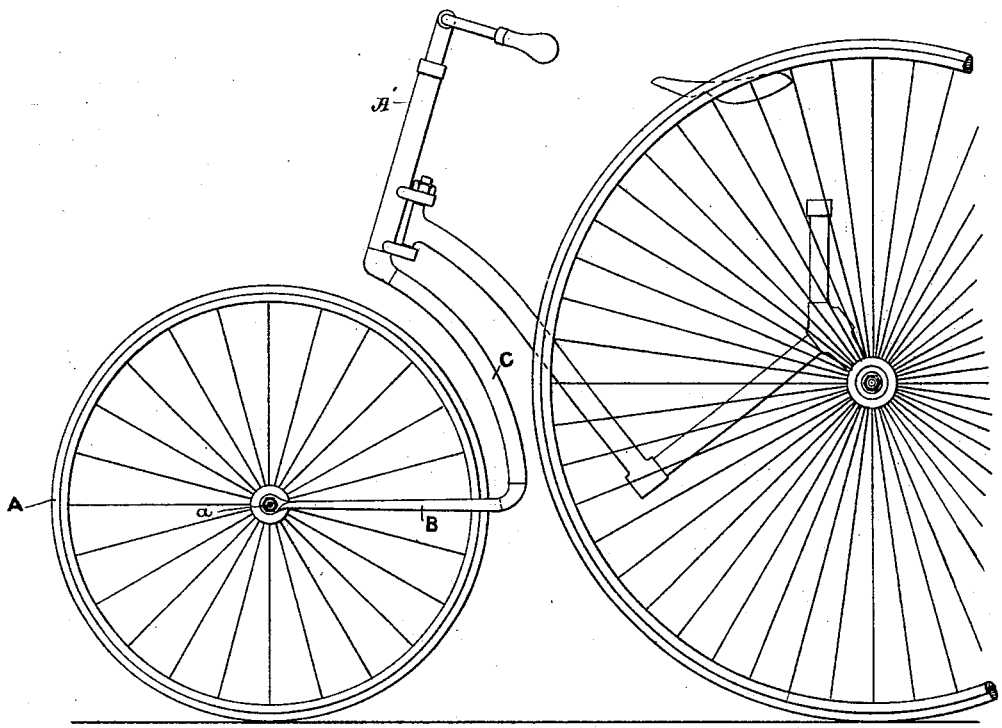
Figure 2:
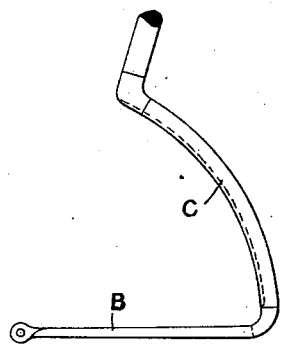
Figure 3:
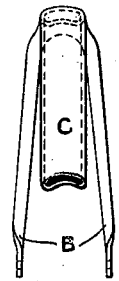

Figure 1 of the accompanying drawings illustrates the application of my invention to a front-steering tricycle, from which its application to other types of velocipedes will be obvious to any one conversant with the construction of these machines. Fig. 2 is a side elevation of my improved fork or frame for carrying the wheel, and Fig. 3 is a plan thereof.

Throughout the several views similar parts are marked with like letters of reference.

Instead of mounting the axle carrying the steering or trailing wheel of a velocipede in a vertical or approximately vertical fork, I mount the axle $a$, carrying the wheel A, in a quadrantal or approximately quadrantal frame, consisting of a horizontal fork, B, and a curved tube, C, the latter of which is riveted and brazed or otherwise fixed to the root of the fork A', so as to form one frame. The fork B is preferably made of spring-steel, so that it is flexible in the vertical plane only. The tube C is preferably made of a crescent section, so that it has the appearance of and also acts as a mud-guard. The curve of the tube C is slightly larger than that of the wheel, so that there is greater clearance between the wheel and the tube at the top than at the bottom, so as to allow room for the play of the wheel, due to the vibration of the horizontal fork. The free end of the tube C is fixed to the main frame of a velocipede, as illustrated by Fig. 1 of the accompanying drawings, or in any other equivalent manner, if the wheel is the steering-wheel of a front-steering bicycle, tricycle, or other velocipede; but if my invention is applied to the trailing wheel of a bicycle, tricycle, or other velocipede the top or free end of the tube C is fixed or attached to the end of the backbone of such machine.

Instead of making C of a tubular crescent section, it may be made of a half-round section, or it may be solid and form merely an extension of the horizontal fork B. Another modification consists of making C of two small tubes or bars trussed and stayed together by suitable stays or clamps.

It will be seen that a wheel mounted in a frame as hereinbefore described will rise more readily over obstacles on the road, and, owing to the elasticity of the fork, will do so with less shock to the machine, and consequently with less vibration, than if it were mounted in an ordinary vertical fork.

It will be apparent that my invention is applicable to all types of velocipedes, whether steered directly or indirectly by a transverse handle-bar or by a side spade-handle through a rack and pinion; but as my invention only relates to the method of mounting and carrying the steering or trailing wheel, and not to a method of controlling it, I have omitted all reference to any other parts of a velocipede other than those directly connected with my invention.

I am aware that the steering and trailing wheels of velocipedes have already been mounted in stiff horizontal forks, and therefore I do not broadly claim mounting a wheel in a horizontal fork; but, Having fully set forth my invention and described how it may be carried into practical effect, I declare that what I claim as my invention and desire to secure by Letters Patent is—

1. In a velocipede, a quadrantal or approximately quadrantal frame consisting, essentially, of a horizontal fork and a curved extension, the ends of the fork carrying a wheel of the vehicle and the free end of the extension being attached to the frame thereof, substantially as set forth.

2. In a velocipede, a frame consisting of a horizontal spring-fork and a curved tubular extension, the free ends of the fork carrying a wheel of the vehicle and the free end of the tubular extension being attached to the frame thereof, substantially as set forth.

3. In a velocipede, a frame consisting of a horizontal spring-fork and a curved tubular extension of crescent section, the free ends of the fork carrying a wheel of the vehicle and the free end of the extension being attached to the frame of the vehicle, substantially as set forth.

4. In a velocipede, the combination, with a steering-wheel and a steering-head, of a frame consisting of a horizontal spring-fork and a curved upward extension, the free ends of the fork carrying the wheel and the free end of the extension being attached to the steering-head, which is located over the wheel, substantially as set forth.

In witness whereof I have hereunto signed my name in the presence of two subscribing witnesses.

HARRY THRESHER.

Witnesses:
ROBT. ED. PHILLIPS,
EDWARD C. HAMMOND.